US010250482B2

(12) United States Patent
Robinette (10) Patent No.: US 10,250,482 B2
(45) Date of Patent: Apr. 2, 2019

(54) DISTRIBUTED TASK EXECUTION IN DIFFERENT LOCATIONS WITH DYNAMIC FORMATION OF TESTING GROUPS

(71) Applicant: HULU, LLC, Santa Monica, CA (US)

(72) Inventor: Michael Patrick Robinette, Seattle, WA (US)

(73) Assignee: HULU, LLC, Santa Monica, CA (US)

( * ) Notice: Subject to any disclaimer, the term of this patent is extended or adjusted under 35 U.S.C. 154(b) by 598 days.

(21) Appl. No.: 14/716,578

(22) Filed: May 19, 2015

(65) Prior Publication Data

US 2016/0344610 A1   Nov. 24, 2016

(51) Int. Cl.
| H04L 12/26 | (2006.01) |
| H04L 12/58 | (2006.01) |
| H04L 29/06 | (2006.01) |
| H04L 29/08 | (2006.01) |

(52) U.S. Cl.
CPC .............. *H04L 43/50* (2013.01); *H04L 51/18* (2013.01); *H04L 65/00* (2013.01); *H04L 67/125* (2013.01); *H04L 67/18* (2013.01)

(58) Field of Classification Search
CPC ............. H04L 29/08981; H04L 12/403; H04L 29/08072
USPC ........................................................ 709/208
See application file for complete search history.

(56) References Cited

U.S. PATENT DOCUMENTS

| 7,716,367 B1 * | 5/2010 | Leighton ........... H04L 29/12066 709/226 |
| 7,912,978 B2 * | 3/2011 | Swildens ................ H04L 12/14 370/229 |
| 2008/0222646 A1 * | 9/2008 | Sigal ....................... G06F 9/505 718/105 |
| 2013/0159498 A1 * | 6/2013 | Funge .................... H04L 65/80 709/224 |

FOREIGN PATENT DOCUMENTS

WO   WO 2011/159986   * 12/2011

* cited by examiner

*Primary Examiner* — Vivek Srivastava
*Assistant Examiner* — Hermon Asres
(74) *Attorney, Agent, or Firm* — Fountainhead Law Group P.C.

(57) ABSTRACT

Particular embodiments execute tasks to measure performance in a computing system. The method uses a master computing device and helper client computing devices. The helper client computing devices may be situated in a pool where the helper client computing devices are available to help a master computing device to perform a task. When the master computing device wants to perform a task, the master computing device may send a message to the pool requesting help with a task. Helper client computing devices can respond to the message when the helper clients are available to join in groups to process tasks. Once the master computing device configures a group with helper client computing devices that responded to the message, the master computing device and the helper client computing devices perform the task together.

20 Claims, 7 Drawing Sheets

| Code Block | Role | Action |
|---|---|---|
| 1. | Master | A |
| 2. | Client #1 | B |
| 3. | Client #2 | C |
| 4. | Master | D |
| 5. | Client #2 | E |
| 6. | Master | F |
| 7. | Client #1 | G |

DISTRIBUTED TASK EXECUTION IN DIFFERENT LOCATIONS WITH DYNAMIC FORMATION OF TESTING GROUPS

BACKGROUND

Many companies use data centers to provide web services to users. Data centers include servers and other computing devices that can provide various services to client devices that users are using. In one example, the data centers host websites in which users can connect to a video delivery service to request videos for delivery to client devices.

The video delivery service would like to provide the best possible service to users. To make sure the service is working properly and has not suffered any degradation, the video delivery service may measure web services' responsiveness constantly to detect any performance degradation and/or breaches of users' service level agreement (SLA) latencies. Generally, data centers will perform their own tests individually. This, however, may not efficiently use the computing resources of each data center.

SUMMARY

In one embodiment, a method configures, in a first location, a helper client computing device with task code that all helper client computing devices can execute. The task code tests a video delivery system configured to deliver videos to video devices. The helper client computing device waits in a group of helper client computing devices for requests from a master computing device that are sent to the group of helper client computing devices in the first location for helping a master computing device in a second location with processing a task. The helper client computing device determines a request in which the helper client computing device can help with processing based on characteristics of the task and sends a response to the master computing device that the helper client computing device will help process the task. The helper client computing device receives an identifier for a first role in the task from the master computing device. The method configures the helper client computing device with the first role where the master computing device and the helper client computing device execute task code that is the same for the task. The helper client computing device determines portions of the task code associated with the first role for the helper client computing device and executes the portions of the task code to process the task to test the video delivery system. Also, the helper client computing device skips portions of the task code not associated with the first role. After finishing processing of the task, the helper client computing device rejoins the group of helper client computing devices that are available to process tasks.

In one embodiment, a non-transitory computer-readable storage medium contains instructions, that when executed, control a computer system to be configured for: configuring, in a first location, a helper client computing device with task code that all helper client computing devices can execute, wherein the task code tests a video delivery system configured to deliver videos to video devices; waiting, by the helper client computing device, in a group of helper client computing devices for requests from a master computing device that are sent to the group of helper client computing devices in the first location for helping a master computing device in a second location with processing a task; determining, by the helper client computing device, a request in which the helper client computing device can help with processing based on characteristics of the task; sending, by the helper client computing device, a response to the master computing device that the helper client computing device will help process the task; receiving, by the helper client computing device, an identifier for a first role in the task from the master computing device; configuring the helper client computing device with the first role, wherein the master computing device and the helper client computing device execute task code that is the same for the task; determining, by the helper client computing device, portions of the task code associated with the first role for the helper client computing device; executing, by the helper client computing device, the portions of the task code to process the task to test the video delivery system, wherein the helper client computing device skips portions of the task code not associated with the first role; and after finishing processing of the task, rejoining, by the helper client computing device, the group of helper client computing devices that are available to process tasks.

In one embodiment, an apparatus includes: one or more computer processors; and a non-transitory computer-readable storage medium comprising instructions, that when executed, control the one or more computer processors to be configured for: configuring, in a first location, a helper client computing device with task code that all helper client computing devices can execute, wherein the task code tests a video delivery system configured to deliver videos to video devices; waiting, by the helper client computing device, in a group of helper client computing devices for requests from a master computing device that are sent to the group of helper client computing devices in the first location for helping a master computing device in a second location with processing a task; determining, by the helper client computing device, a request in which the helper client computing device can help with processing based on characteristics of the task; sending, by the helper client computing device, a response to the master computing device that the helper client computing device will help process the task; receiving, by the helper client computing device, an identifier for a first role in the task from the master computing device; configuring the helper client computing device with the first role, wherein the master computing device and the helper client computing device execute task code that is the same for the task; determining, by the helper client computing device, portions of the task code associated with the first role for the helper client computing device; executing, by the helper client computing device, the portions of the task code to process the task to test the video delivery system, wherein the helper client computing device skips portions of the task code not associated with the first role; and after finishing processing of the task, rejoining, by the helper client computing device, the group of helper client computing devices that are available to process tasks.

The following detailed description and accompanying drawings provide a better understanding of the nature and advantages of particular embodiments.

DETAILED DESCRIPTION

Described herein are techniques for a performance testing system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments execute tasks to measure performance in a computing system. The method uses a master computing device and helper client computing devices. The helper client computing devices may be situated in a pool where the helper client computing devices are available to help a master computing device to perform a task. When the master computing device wants to perform a task, the master computing device may send a message to the pool requesting help with a task. Helper client computing devices can respond to the message when the helper clients are available to join in groups to process tasks. Once the master computing device configures a group with helper client computing devices that responded to the message, the master computing device and the helper client computing devices perform the task together. When a service (e.g., a video delivery service) includes multiple locations, such as data centers, particular embodiments allow a master computing device to perform the task using helper client computing devices in any location, such as in multiple locations. This allows efficient use of resources and also allows cross-location measurements to be made. Further, to allow the use of pools and the forming of groups, master computing device and helper client computing devices are specially configured so that the groups can be dynamically formed to execute tasks.

Figure 1:
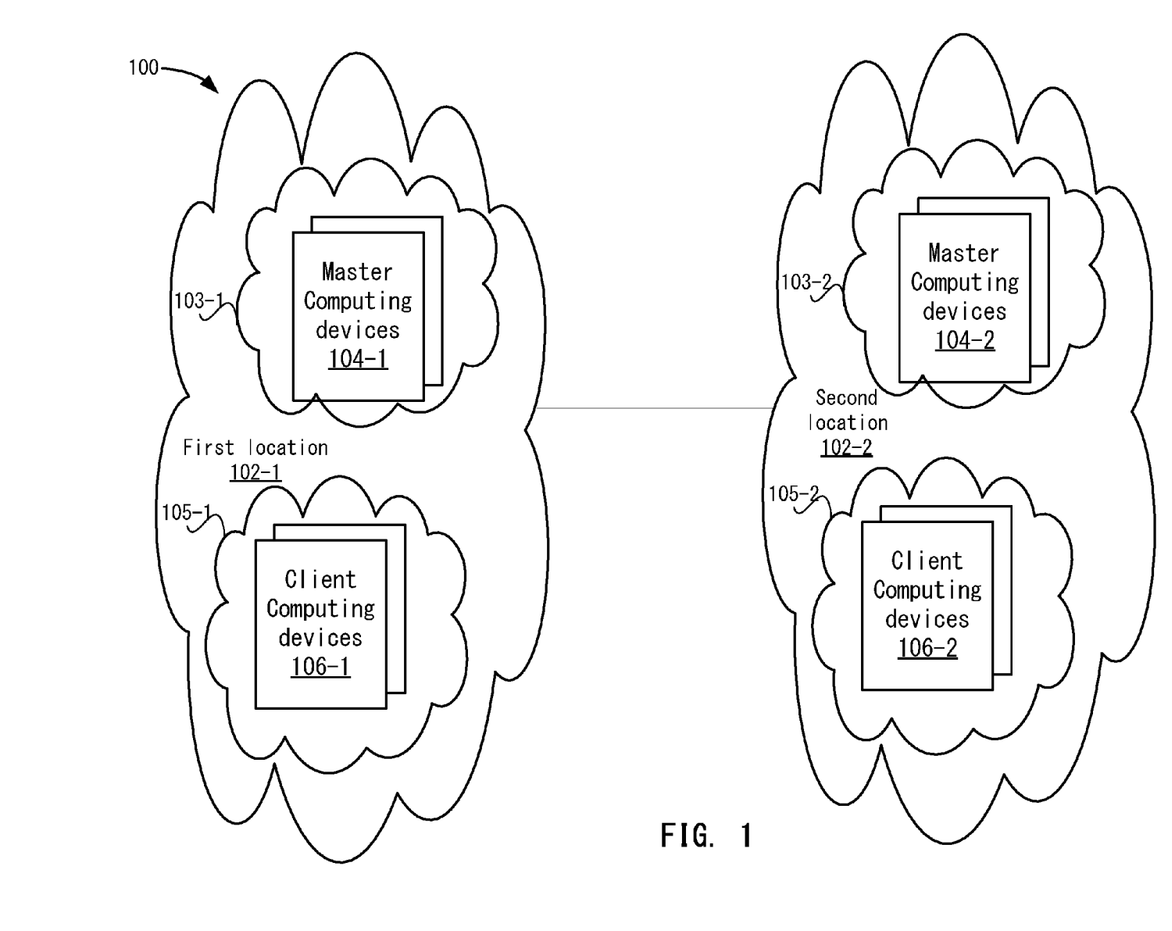
FIG. 1 depicts a simplified system including multiple locations that are used to perform tasks according to one embodiment.

FIG. 1 depicts a simplified system 100 including multiple locations that are used to perform tasks according to one embodiment. System 100 includes a first location 102-1 and a second location 102-2, but more locations 102 may also be included. Locations 102 may be locations that include multiple computing devices, such as data centers. The data centers may internally link the computing devices (e.g., servers) via local area networks (LANs). Different data centers may then be externally linked via wide area networks (WANs). Generally, communications via the LAN (or internally within a data center) are faster than communications via the WAN. Locations are not restricted to data centers, however. For example, locations 102 may be any places in which computing devices are needed for performing tasks, such as a location including user client devices, an office including servers, etc.

Location 102-1 includes a pool 103-1 of master computing devices 105-1 and a pool 105-1 of helper client computing devices 106-1. Location 102-2 similarly has a pool 103-2 of master computing devices 104-2 and a pool 105-2 of helper client computing devices 106-2. It should be noted that master computing devices and helper client computing devices may be found on the same computing device, such as in different virtual machines (VMs). Further, a master computing device 104 may at another time become a helper client computing device 106, and vice versa.

Master computing devices 104-1 may be computing devices that want to run a task. The master may initiate and coordinate the running of the task, which may be any set of operations that need to be performed. For example, a task may make a measurement of a service that is performed. Master computing devices 104 may be instantiated to form groups to run tasks constantly.

Helper client computing devices 106 may have multiple states. One state is an available state where helper client computing devices 106 are waiting to help a master computing device 104 with a task. Another state is an unavailable state when helper client computing devices 106 are currently helping a master computing device 104 with a task and do not have computing resources available to help another master computing device 104 with a task. Helper client computing devices 106 may transition between the available and unavailable status multiple times as tasks are processed and then finished.

Helper client computing devices 106 can help other master computing devices 104 and also other helper client computing devices to perform a task. Accordingly, one helper client computing device 106 may help on multiple different tasks with different master computing devices and helper client computing devices at different times. Depending on availability, different helper client computing devices 106 may join a group to process a task when requested.

Particular embodiments configure helper client computing devices 106 with logic such that helper client computing devices 106 can join any tasks that are requested from master computing devices 104. In this way, master computing devices 104 can send a general request in which any helper client computing devices 106 can respond to join the group for the task. These helper client computing devices 106 can also be in different locations. This may provide a greater number of possible resources and also allow for tasks that can be tested in different locations 102. By allowing any available helper client computing devices 106 to join any task, tasks can be completed across different locations. This allows geographical location to be used in creating tasks. For example, a master computing device 104 may specifically ask for a helper client computing device in a specific location 102 and a helper client computing device in that location may join the task if available. The task can then be written based on geographic location. Also, having the dynamic groups helps with failover situations. Conventionally, if one computing device was assigned to task A and happens to be offline/unreachable for a while, then task A is unable to run. By having dynamic groups some other helper client computing devices 106 can step in to take offline computing device's place. This is important as the system as a whole is measuring the responsiveness of the system under test, and being able to produce measurements under failure conditions/network outages is key.

The ability to join tasks dynamically allows for the more efficient use of resources. Helper client computing devices 106 may be available in the group for immediate execution of a task. Helper client computing devices 106 do not need to be specifically configured for the task. Rather, helper client computing devices 106 leverage pre-loaded logic that allows it to process the requested task. For example, as will be described below, helper client computing devices 106 have access to all task code in which code can be executed based on what role the helper client computing device is assigned.

Master Computing Device and Helper Client Computing Device Configuration

Figure 2:
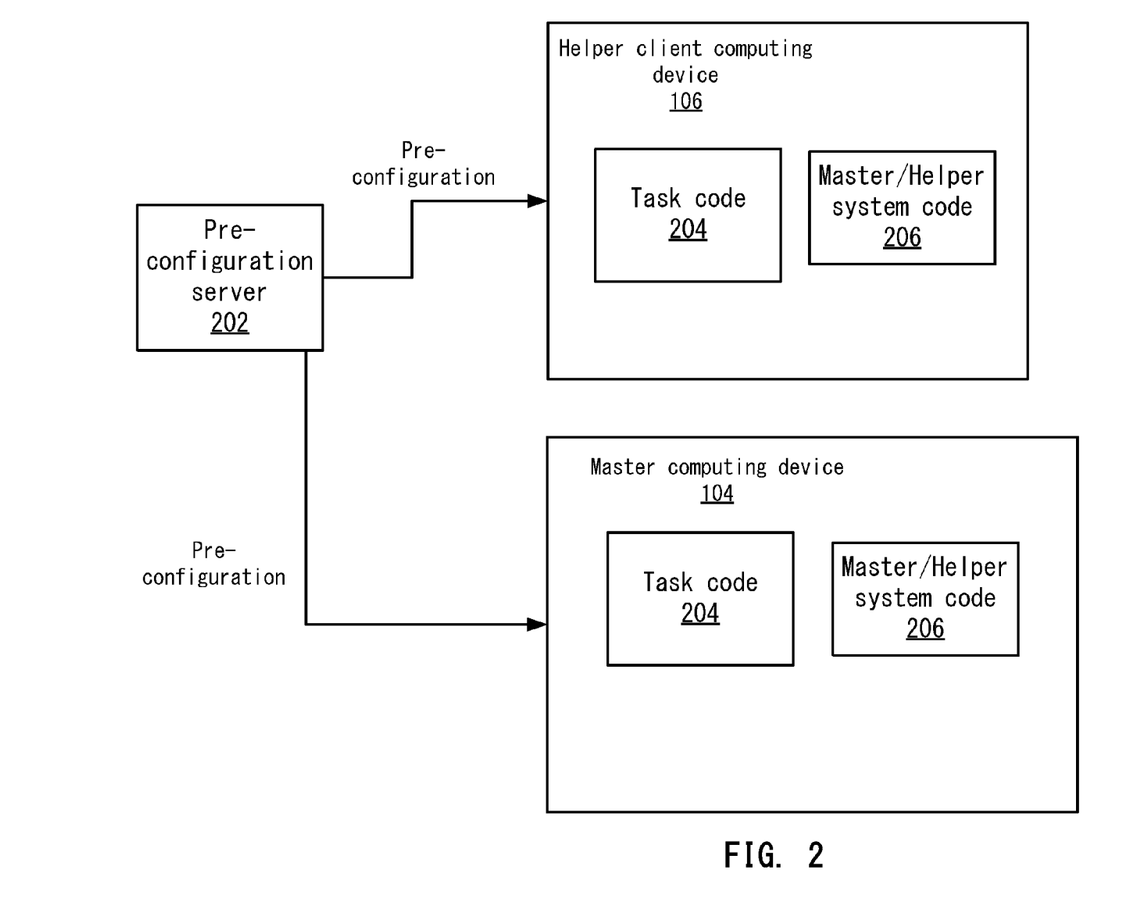
FIG. 2 depicts an example system for pre-configuring master computing devices and helper client computing devices according to one embodiment.

To allow helper client computing devices 106 to dynamically join groups to perform tasks, system 100 is pre-configured before the tasks are performed. FIG. 2 depicts an example system for pre-configuring master computing devices 104 and helper client computing devices 106 according to one embodiment. A pre-configuration server 202 may pre-configure helper client computing devices 106. In one example, pre-configuration server 202 loads task code 204 into helper client computing devices 106. Task code 204 includes information about any tasks that can be performed by master computing devices 104 and helper client computing devices 106. Task code 204 includes information such as the amount of helper client computing devices 106 needed for the task, the task to be executed, and the software code for the task.

Master computing devices 104 and helper client computing devices 106 are pre-configured with a shared library of system software code shown as master/helper system code 206 to run tasks. The system code 208 may include a list of tasks and when to run the tasks for master computing devices 104. For helper client computing devices 106, system code 206 allows them to join groups to perform tasks. Also, helper client computing devices 106 are configured to task code 204 when joining the group to determine how to perform the task.

In one embodiment, task code 204 and system code 206 may include code for both master computing devices 104 and helper client computing devices 106 together. This allows the same code to be distributed to both master computing devices 104 and helper client computing devices 106. As will be discussed below, by using the same code, performing of the task in a distributed manner may be coordinated more easily. Task code 204 and system code 206 include both master computing devices 104 sections and helper client computing devices 106 sections.

One part of the pre-configuration is to configure helper client computing devices 106 with logic to switch between the available and unavailable status. Also, the pre-configuration does not specify which tasks will be performed by helper client computing devices 106. Rather, helper client computing devices 106 perform tasks based on requests and which helper client computing devices 106 are available at that time. Helper client computing devices 106 may use system code 206 to determine attributes about themselves that will allow them to response to task requests. For example, helper client computing devices 106 load several constants from the system to determine what pool the helper client will use in the form of several system environment variables: "DC" contains the datacenter the client is located in, "ENV" contains the environment (Might be Production, Staging, Testing, Development, etc.), etc.

Group Formation

Figure 3:
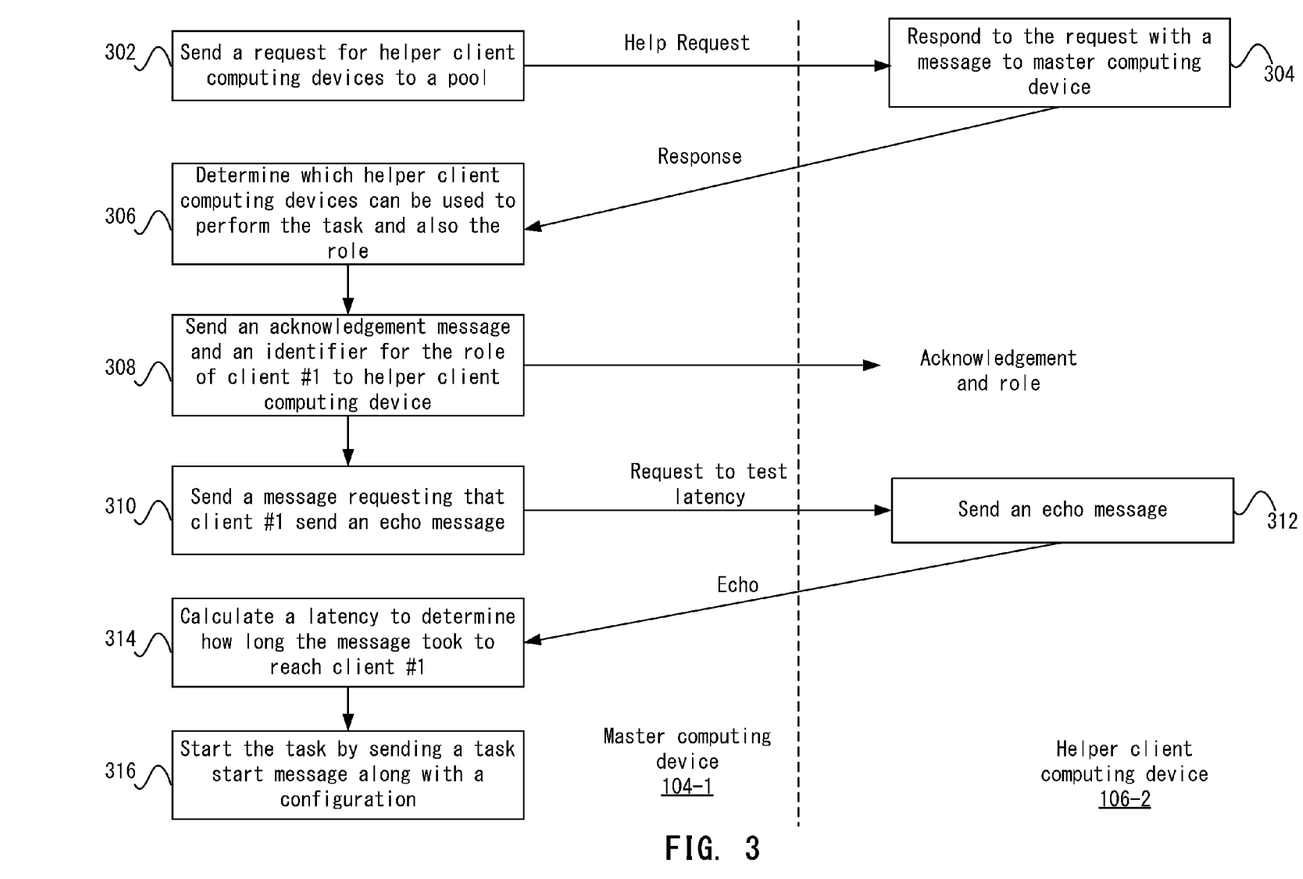
FIG. 3 shows a data flow to form the group of helper client computing devices according to one embodiment.

The first step to performing a task is for master computing device 104 to form a group of helper client computing devices 106 that will help in performing the task. FIG. 3 shows a data flow to form the group of helper client computing devices according to one embodiment. When a master computing device 104-1 wants to perform a task, master computing device 104-1 may consult task code 204 to determine information about the task. The task may indicate whether or not helper client computing devices 106 are needed or not. If not, then master computing device 104-1 will perform the task and not form a group. When a task requires a group, master computing device 104-1 must dynamically form a group. The members of the group are not pre-configured and are based on availability of helper client computing devices 106 at the time.

In one example, the task may require the help of a helper client computing device 106-2 in location 102-2. Further, although not shown in this data flow, the task may also require help of another helper client computing device 106-1 in the same location 102-1 as master computing device 104-1.

At 302, to obtain a helper client computing device in a different location, master computing device 104-1 sends a request for helper client computing devices to a pool 105-2 of helper client computing devices 106-2. The request may include some parameters that are needed to join the group. For example, the parameters may specify characteristics that are needed, such as location, processing power, etc. Helper client computing devices 106-2 that are available in pool 105-2 can then respond to the request. In this case, helper client computing devices 106-2 with a state of available review the request. In one example, at 304, a specific helper client #1 responds to the request with a message to master computing device 104-1. The response may indicate helper client #1 is available to help. Also, other helper client computing devices 106-2 may also respond indicating their availability to help (not shown).

Once receiving responses from helper client computing devices 106-2, at 306, master computing device 104-1 can determine which helper client computing devices can be used to perform the task and also determine the role in which the helper client computing devices will play in performing the task. That is, a task may require multiple helper client computing devices to perform certain actions. By assigning the roles to each helper client computing device, the helper client will know which part of the task to perform. The role may be identified by an identifier, such as one role will be client #1 and another role will be client #2. Once the roles are determined, at 308, master computing device 104-1 sends an acknowledgement message and an identifier for the role of client #1 to helper client computing device 106-2.

Because helper client computing device 106-2 is located in a different location, master computing device 104-1 needs to determine the latency it will take to message with client #1. In this case, at 310, master computing device 104-1 sends a request to test the latency that asks for an echo message to be sent. At 312, when client #1 receives the message, client #1 sends an echo message. At 314, master computing device 104-1 calculates the latency to determine how long the message took to reach client #1. This latency is then used to adjust any responses from client #1 during performing of the test. This adjustment allows the task to be performed cross-location as the adjustment accounts for the latency that may occur to receive confirmation of when actions are performed in different locations. That is, using the latency of 1 second, master computing device 104-1 can determine that client #1 completed action #1 one second before receiving a message stating that action #1 was completed.

At 316, master computing device 104-1 then starts the task by sending a task start message along with a configuration. The configuration that is sent may identify which configuration should be used in performing a task. For example, the configuration may contain task level configurations such as # of times to perform a measurement in order to calculate an average. Additionally if a task requires some state to be shared by helper client computing devices 106 and master computing devices 104, it may be sent within this configuration, such as a specific channel to use during a send/receive test.

Figure 4:
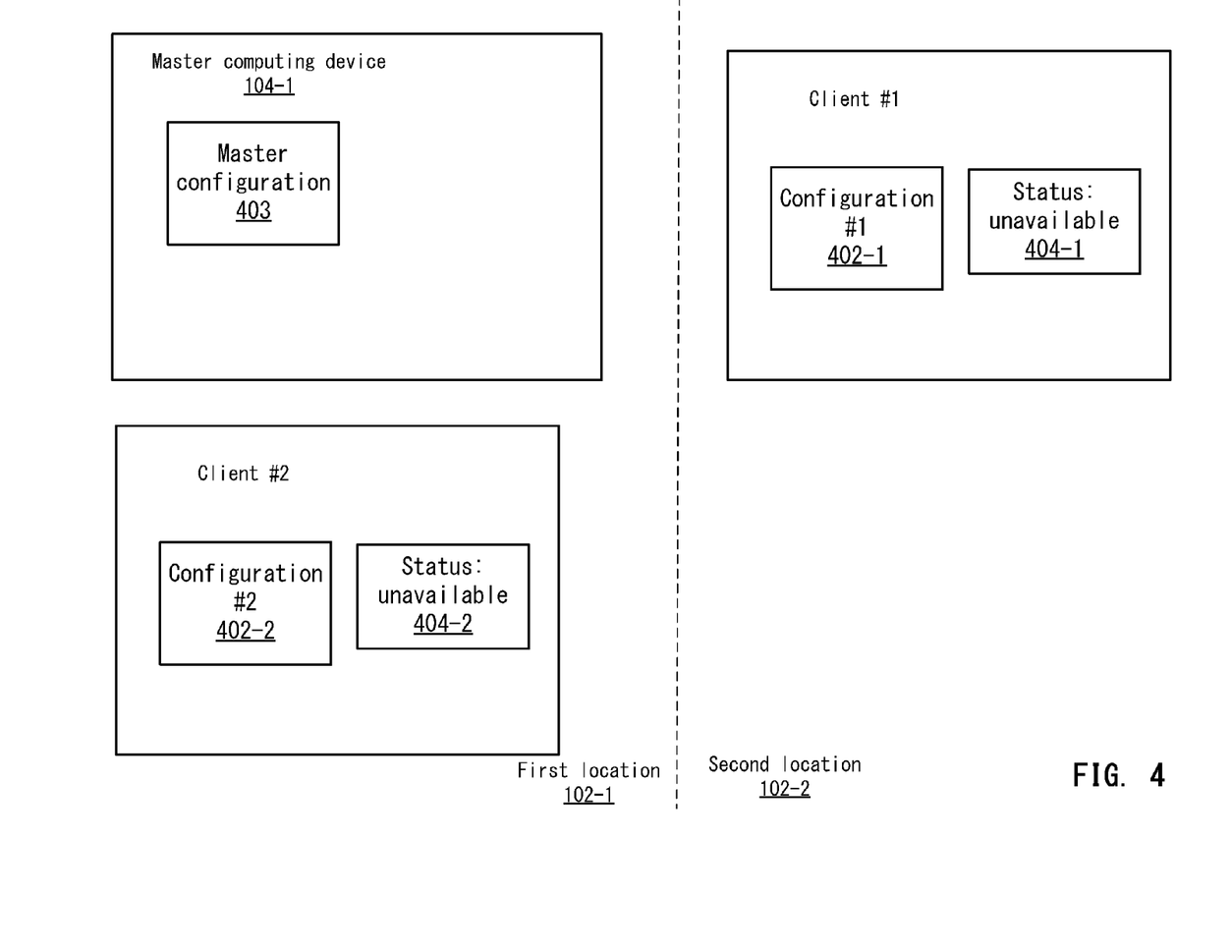
FIG. 4 shows an example of a group that has been configured to perform a task according to one embodiment.

FIG. 4 shows an example of a group that has been configured to perform a task according to one embodiment. In this case, master computing device 104-1, a client #1 in second location 102-2 and a client #2 in first location 102-1 are performing the task as a group. At 402-1 and 402-2, respectively, client #1 is configured with configuration #1 in the task and client #2 is configured with configuration #2. Also, at 403, master computing device 104-1 is configured with a master configuration. These configurations may be used to perform different portions of the task.

Because helper client computing devices 106 and master computing devices 104 have a copy of task code 204 for all helper clients and masters, helper client computing devices 106 can look up the task in task code 204. When configured with the client number in the task, helper client computing devices 106 then execute what sections are associated with their client number as will be discussed in more detail below.

The status of each of the clients has been moved from available to unavailable at 404-1 and 404-2, respectively. In this case, clients #1 and #2 will not respond to other task requests because they are not available to help.

Task Execution

Figure 5:
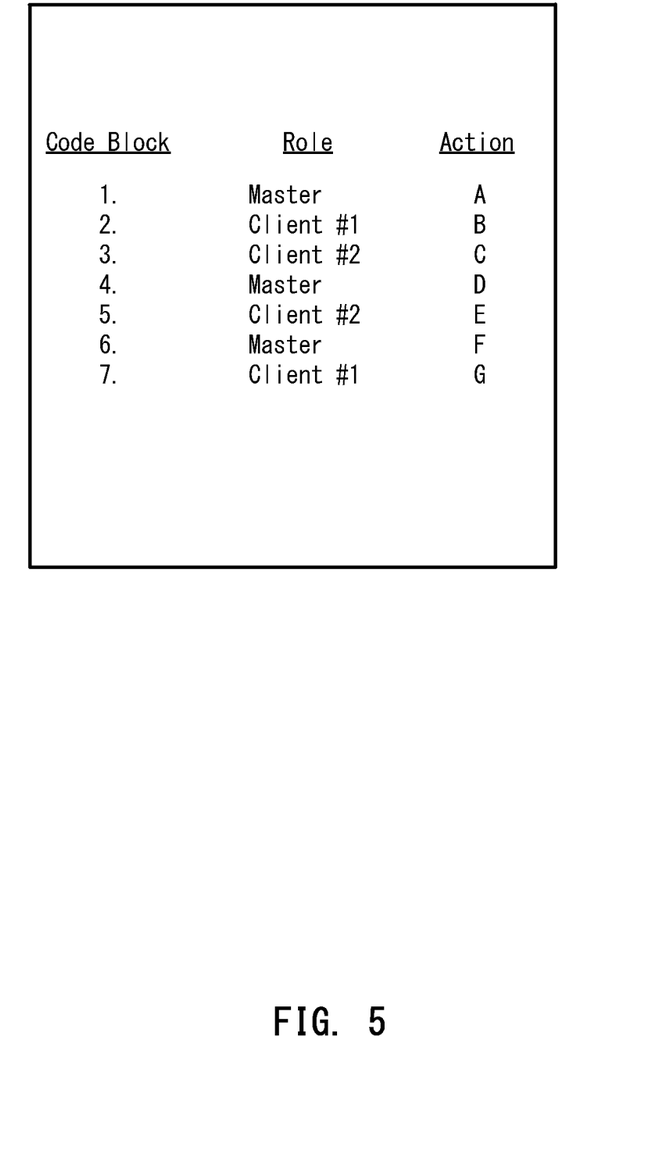
FIG. 5 shows an example of software code for a task according to one embodiment.

Each task may include software code that defines actions that need to be performed to execute the task. FIG. 5 shows an example of software code for a task according to one embodiment. The software code shown is conceptual, and shows certain code blocks may be identified by configuration identifiers. For example, code blocks #1-#7 may be code that needs to be executed by either master computing device 104-1 or helper client computing devices 106. That is, actions A-G are performed by executing code blocks #1-#7. Each code block may be identified by a configuration role, such as code block #1 is associated with the master computing device, code block #2 is associated with client #1, code block #3 with client #2, code block #4 with the master computing device, code block #5 with client #2, code block #6 with the master computing device, and code block #7 with client #1. In one embodiment, each master computing device and client in the task group may load the same code for execution. However, a specific master computing device or client only executes the code blocks that have been identified by its assigned configuration. That is, the master computing device executes code blocks #1, #4, and #6; client #1 executes code blocks #2 and #7; and client #2 executes code blocks #3 and #5.

By loading the same software code, helper client computing devices can automatically be configured with software code and dynamically join various tasks without being pre-configured to perform the tasks. Instead of a client #1 being configured to just execute code blocks #2 and #7, client #1 may review all code blocks in the task, but just execute code blocks #2 and #7. Various barriers may be set up such that client #1 may execute its code blocks in the correct order. This is different than if client #1 only had code blocks #2 and #7 to execute without any knowledge of what the master computing device and client #2 are executing.

Because helper client computing devices 106 do not know what task code is going to be executed until they join groups, task code is written for all helper client computing devices 106 for readability, clarity, and efficiency. In order to allow helper client computing devices 106 to have access to the same code, helper client computing devices 106 only execute the task code relevant to the client's role. Without including all of the task code, coordination as to when clients can execute code is needed and which clients load which code.

Figure 6:
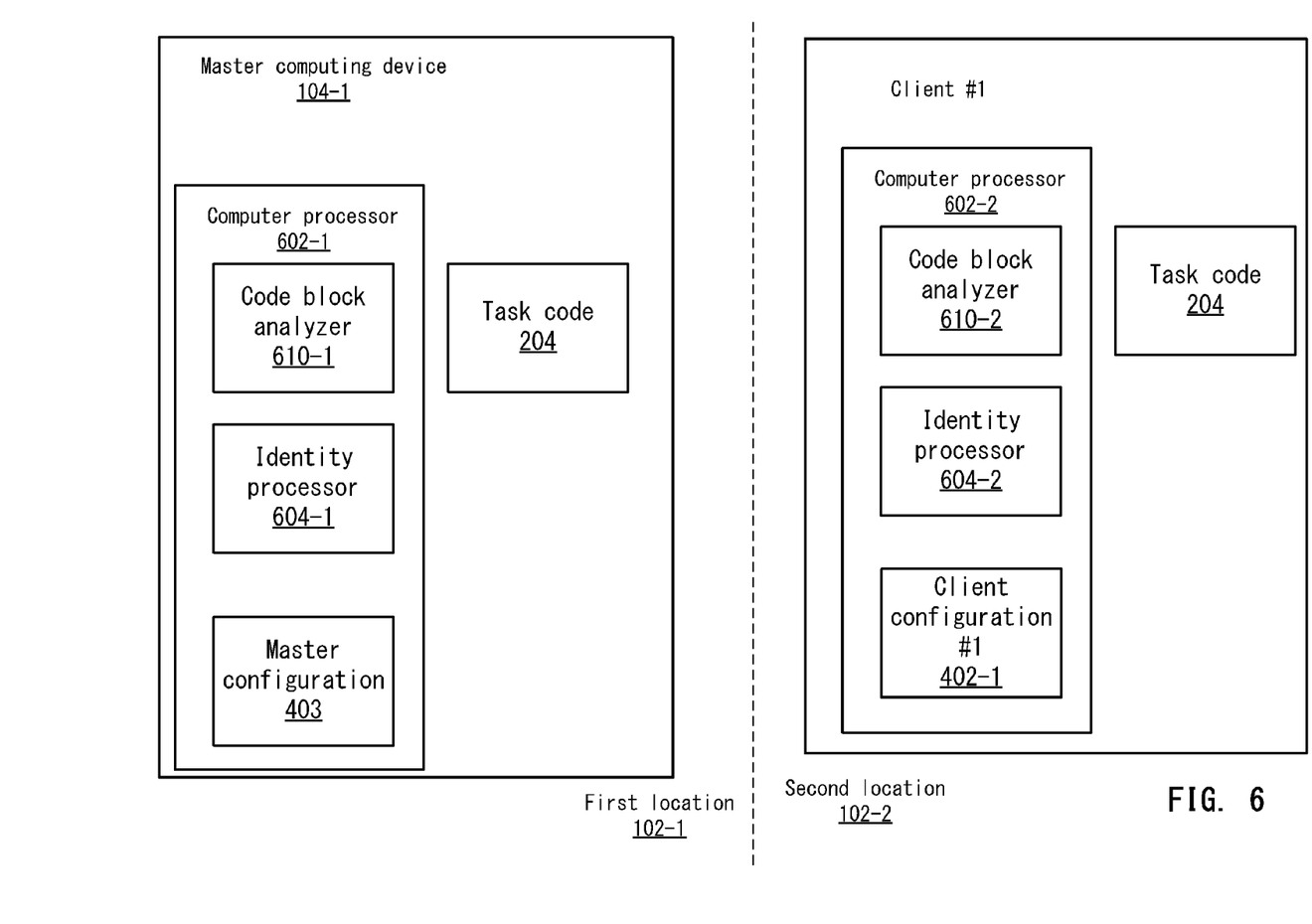
FIG. 6 shows a more detailed example of a client, such as client #1, and a master computing device according to one embodiment.

FIG. 6 shows a more detailed example of a client 106-2, such as client #1, and a master computing device 104-1, according to one embodiment. Both client #1 and master computing device 104-1 include a computer processor 602-1 and a computer processor 602-1 602-2, respectively. An identity processor 604-1 and identity processor 604-2, respectively, may determine the configuration being used. For example, master computing device 104-1 includes a master configuration 403 and client #1 includes a client #1 configuration 402-1. Identity processors 604-1 and 604-2 determine the configuration and provides the identity to a code block analyzer 610.

Code block analyzers 610-1 and 610-2 may determine the code for the task from a task code 204. For example, task code 204 may include code for all tasks that may be initiated by master computing devices 106-1.

Processor 602-1 may select the specific code for the correct task from task code 204. Then, code block analyzer 610-1 may execute the code based on the configuration role assigned to it, such as the master configuration identifier. Also, code block analyzer 610-2 may execute the code based on the client configuration role assigned to it.

Master computing device 106-1 may retrieve the task from task code 204. The task will indicate whether other helper clients are needed to perform the task. If other helper clients are needed, master computing device 106-1 may send the requests for other helper clients 106-2 as described above. If no other helper clients are needed, master computing device 106-1 may start to execute the task without any helper client computing devices 106.

In one example, the task may want to measure how long an action taken in a location takes to perform. For example, master computing device 106-1 may want to know how long it takes for a helper client computing device 106-2 in location 102-2 to join a channel, such as a video channel or a communication channel. In this case, the system is testing is essentially a real-time messaging system. This messaging system is channel based, so a client would join a channel and will now receive all messages sent to that channel. A client can also send to any channel. In this case, master computing device 106-1 may join the channel. This may be performed by executing code block #1 for master computing device 106-1. Master computing device 106-1 may also start a timer to determine how long it takes client #1 to join the channel. In a code block #2, client #1 may also join the channel. After joining the channel, client #1 sends an update to master computing device 106-1 that the channel has been joined. Master computing device 106-1 may stop a timer when the update is received. Then, because there may be latency when sending the update from location 102-2 to location 102-1, master computing device 106-1 subtracts the latency from the time of the timer. Then, master computing device 106-1 now knows how long it took for client #1 to join the channel. Other tests may be run such as basic application programming interface (API) calls, such as sending messages, leaving a channel, querying a channel, how long it takes to receive a presence update, or a channel message.

Once the task is finished, then client #1 and client #2 return to the pool of helper client computing devices. The helper client computing devices change their status and are now available to help with another task.

Figure 7:
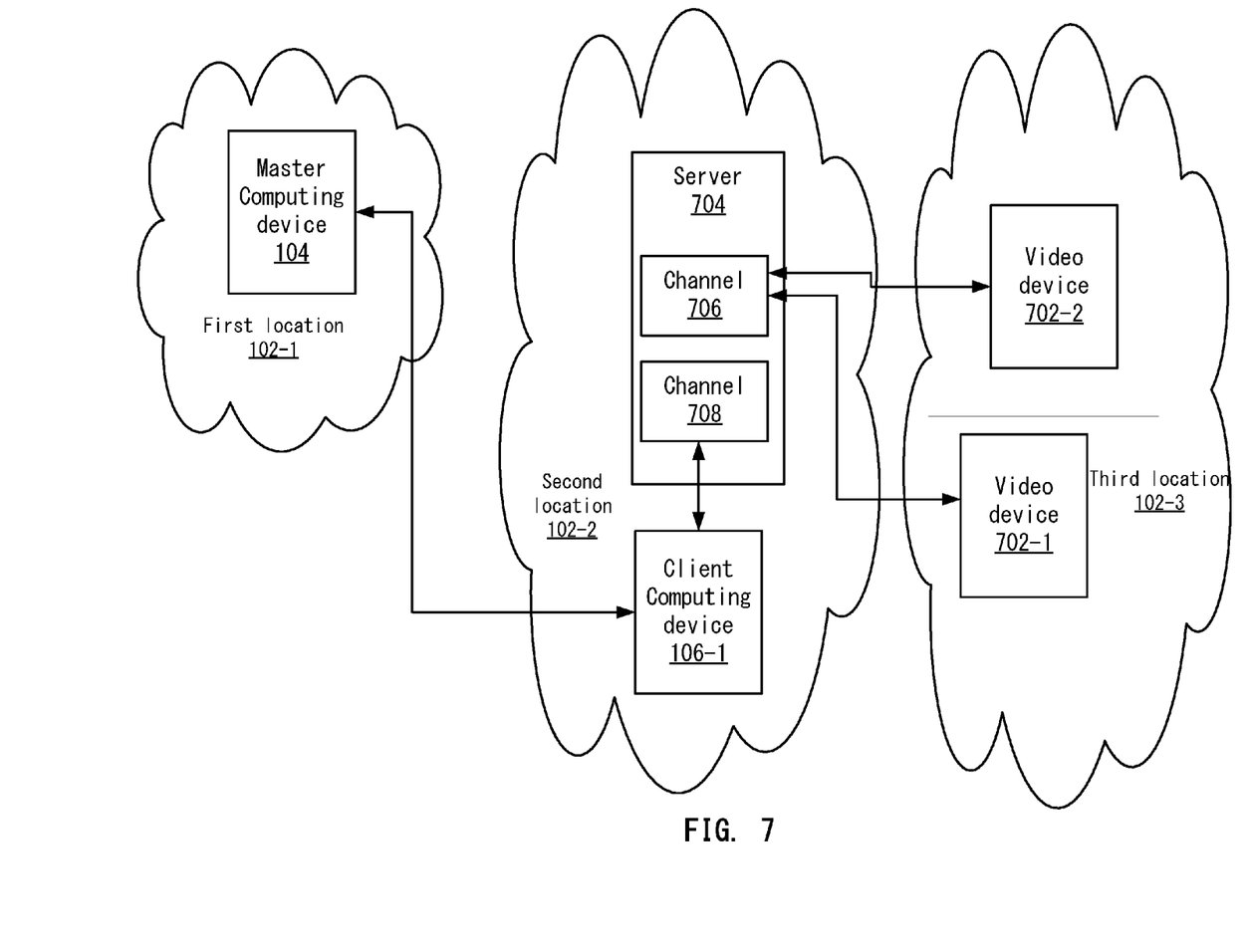
FIG. 7 depicts an example of testing the video delivery system according to one embodiment.

Particular embodiments may be used to test a messaging system being used with a video delivery system. FIG. 7 depicts an example of testing the video delivery system according to one embodiment. In a location 102-3, such as a user's home, a first video device 702-1 is messaging with a second video device 702-2. For example, first video device 702-1 and second video device 702-2 may be using a video delivery service to play videos on second video device 702-2 (or on a television connected to second video device 702-2). First video device 702-1 may be a smart phone or other computing device that is used to control second video device 702-2, such as the smart phone is being used as a remote control for console.

To message with each other, first video device 702-1 and second video device 702-2 join a channel in a data center associated with the video delivery service. For example, first video device 702-1 and second video device 702-2 join a channel 706 being run on a server 704 in location 102-2. The channel that is joined may be offered by a location (data center) that is closest to the video devices 702, such as location 102-2. In one embodiment, a channel can be joined by devices and messages sent to the channel are forwarded by server 704 to the devices that joined the channel. In one example, first video device 702-1 may cause second video device 702-2 to play a video. During the playing of the video, second video device 702-2 may send updates on the progress of the video to first video device 702-1 through channel 706.

Master computing device 104 may want to test the response times for location 102-2. To test that server 704 is running properly, master computing device 104 may test another channel 708 running on server 704 instead of the channel that video devices 702 joined. This may not affect the operation of a live channel being used by video devices. In this case, helper client computing device 106 may execute task code 204 to join channel 708 and master computing device 104 tests the responsiveness of the channel.

Because the video delivery service may use multiple locations 102, particular embodiments provide a testing system to allow for helper client computing devices 106 to help perform tests in all locations 102. Also, the testing system is flexible and efficient. Helper client computing devices 106 can join tasks when they are available, which uses resources more efficiently than if there were dedicated resources for tasks. Also, failover situations can be handled because other helper client computing devices 106 can join a task if some devices fail.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
configuring a helper client computing device with task code that all helper client computing devices can execute, wherein the task code tests a video delivery system configured to deliver videos to video devices, and wherein the task code includes a plurality of portions that correspond to a plurality of roles;
waiting, by the helper client computing device, in a group of helper client computing devices for requests from a master computing device that are sent to the group of helper client computing devices for helping a master computing device with processing a task;
determining, by the helper client computing device, a request in which the helper client computing device can help with processing based on characteristics of the task;
sending, by the helper client computing device, a response to the master computing device that the helper client computing device will help process the task;
configuring the helper client computing device with a first role in the plurality of roles, wherein the master computing device is configured with a second role in the plurality of roles;
determining, by the helper client computing device, one or more portions of the task code associated with the first role for the helper client computing device;
executing, by the helper client computing device, the one or more portions of the task code that are associated with the first role to process the task to test the video delivery system, wherein the helper client computing device skips one or more portions of the task code not associated with the first role, and wherein the master computing device executes one or more portions of the task code that are associated with the second role and skips the one or more portions of the task code that are not associated with the second role; and after finishing processing of the task, rejoining, by the helper client computing device, the group of helper client computing devices that are available to process tasks.

2. The method of claim 1, further comprising:
sending, by the helper client computing device, a message to allow the master computing device to determine a latency for sending messages between the helper client computing device and the master computing device.

3. The method of claim 2, further comprising:
sending, by the helper client computing device, messages to the master computing device based on the executing of the one or more portions of the task code that are associated with the first role, wherein the master computing device uses the latency in analyzing the processing of the task.

4. The method of claim 1, wherein:
the helper client computing device is a first helper client computing device,
the task includes a second helper client computing device that joins the task with a third role,
the second helper client computing device executes one or more portions of the task code that are associated with the third role, and
the second helper client computing device skips portions of the task code that not associated with the third role.

5. The method of claim 1, wherein:
the helper client computing device and the master computing device load the task code into local memory before executing of the task.

6. The method of claim 1, wherein:
the helper client computing device and the master computing device load system code into local memory to configure the helper client computing device and the master computing device to perform the task.

7. The method of claim 6, wherein:
the system code is used to join the group and join the task.

8. The method of claim 1, wherein:
the video delivery system comprises video devices using a server in the first location, and
the helper client computing device is testing performance of the server with the task.

9. A non-transitory computer-readable storage medium containing instructions, that when executed, control a computer system to be configured for:
configuring a helper client computing device with task code that all helper client computing devices can execute, wherein the task code tests a video delivery system configured to deliver videos to video devices, and wherein the task code includes a plurality of portions that correspond to a plurality of roles;
waiting, by the helper client computing device, in a group of helper client computing devices for requests from a master computing device that are sent to the group of helper client computing devices for helping a master computing device with processing a task;
determining, by the helper client computing device, a request in which the helper client computing device can help with processing based on characteristics of the task;
sending, by the helper client computing device, a response to the master computing device that the helper client computing device will help process the task;
configuring the helper client computing device with a first role in the plurality of roles, wherein the master computing device is configured with a second role in the plurality of roles;
determining, by the helper client computing device, one or more portions of the task code associated with the first role for the helper client computing device;
executing, by the helper client computing device, the one or more portions of the task code that are associated with the first role to process the task to test the video delivery system, wherein the helper client computing device skips one or more portions of the task code not associated with the first role, and wherein the master computing device executes one or more portions of the task code that are associated with the second role and skips the one or more portions of the task code that are not associated with the second role; and after finishing processing of the task, rejoining, by the helper client computing device, the group of helper client computing devices that are available to process tasks.

10. The non-transitory computer-readable storage medium of claim 9, further configured for:
sending, by the helper client computing device, a message to allow the master computing device to determine a latency for sending messages between the helper client computing device and the master computing device.

11. The non-transitory computer-readable storage medium of claim 10, sending, by the helper client computing device, messages to the master computing device based on the executing of the one or more portions of the task code that are associated with the first role, wherein the master computing device uses the latency in analyzing the processing of the task.

12. The non-transitory computer-readable storage medium of claim 9, wherein:
the helper client computing device is a first helper client computing device,
the task includes a second helper client computing device that joins the task with a third role,
the second helper client computing device executes one or more portions of the task code that are associated with the third role, and
the second helper client computing device skips portions of the task code that not associated with the third role.

13. The non-transitory computer-readable storage medium of claim 9, wherein:
the helper client computing device and the master computing device load the task code into local memory before executing of the task.

14. The non-transitory computer-readable storage medium of claim 9, wherein:
the helper client computing device and the master computing device load system code into local memory to configure the helper client computing device and the master computing device to perform the task.

15. The non-transitory computer-readable storage medium of claim 9, wherein:
the system code is used to join the group and join the task.

16. The non-transitory computer-readable storage medium of claim 9, wherein:
the video delivery system comprises video devices using a server in the first location, and
the helper client computing device is testing performance of the server with the task.

17. An apparatus comprising:
one or more computer processors; and
a non-transitory computer-readable storage medium comprising instructions, that when executed, control the one or more computer processors to be configured for:
configuring a helper client computing device with task code that all helper client computing devices can execute, wherein the task code tests a video delivery system configured to deliver videos to video devices, and wherein the task code includes a plurality of portions that correspond to a plurality of roles;
waiting, by the helper client computing device, in a group of helper client computing devices for requests from a master computing device that are sent to the group of helper client computing devices for helping a master computing device with processing a task;
determining, by the helper client computing device, a request in which the helper client computing device can help with processing based on characteristics of the task;
sending, by the helper client computing device, a response to the master computing device that the helper client computing device will help process the task;
configuring the helper client computing device with a first role in the plurality of roles, wherein the master computing device is configured with a second role in the plurality of roles;
determining, by the helper client computing device, one or more portions of the task code associated with the first role for the helper client computing device;

executing, by the helper client computing device, the one or more portions of the task code that are associated with the first role to process the task to test the video delivery system, wherein the helper client computing device skips one or more portions of the task code not associated with the first role, and wherein the master computing device executes one or more portions of the task code that are associated with the second role and skips the one or more portions of the task code that are not associated with the second role; and after finishing processing of the task, rejoining, by the helper client computing device, the group of helper client computing devices that are available to process tasks.

18. The apparatus of claim 17, further configured for:

sending, by the helper client computing device, a message to allow the master computing device to determine a latency for sending messages between the helper client computing device and the master computing device.

19. The apparatus of claim 17, wherein:

the helper client computing device is a first helper client computing device, the task includes a second helper client computing device that joins the task with a third role, the second helper client computing device executes one or more portions of the task code that are associated with the third role, and the second helper client computing device skips portions of the task code that not associated with the third role.

20. The apparatus of claim 17, wherein:

the helper client computing device and the master computing device load the task code into local memory before executing of the task.

\* \* \* \* \*